United States Patent [19]

Parrondo

[11] 4,092,563
[45] May 30, 1978

[54] FLASHER INDUCTANCE CIRCUIT

[75] Inventor: Henry Parrondo, North Merrick, N.Y.

[73] Assignee: Ideal Corporation, Brooklyn, N.Y.

[21] Appl. No.: 718,566

[22] Filed: Aug. 30, 1976

[51] Int. Cl.$^2$ .............................................. B60Q 1/34
[52] U.S. Cl. ........................... 315/200 A; 200/144 R; 315/77; 337/273; 340/81 R
[58] Field of Search ....................... 315/77, 83, 200 A; 340/81 R; 200/144 R, 61.27; 337/273

[56] References Cited

U.S. PATENT DOCUMENTS

| 2,992,336 | 7/1961 | Curtner | 340/81 R X |
| 3,925,757 | 12/1975 | Kimmelman | 340/81 R X |

*Primary Examiner*—Eugene R. LaRoche
*Attorney, Agent, or Firm*—Albert C. Johnston; Gerard F. Dunne

[57] ABSTRACT

Deterioration of the electrical contacts of variable load flashers provided for intermittently energizing vehicle signal lamps is inhibited by the provision of a coiled length of a current conductor having a suitable inductance value connecting the flasher contacts with at least one output terminal. In the case of a two-terminal flasher, the conductor extends to the single output terminal from a junction at the flasher contacts and in such a flasher for use in a signal lamp circuit having a relatively high current load, the coiled length is wound about a heat conductive core member connected to the single output terminal and has an inductance value of about 5.8 to 6 microhenrys. In two terminal flashers for use in signal lamp circuits having a lower current load, the coiled length may have an air core and an inductance value of about 2 to 2.2 microhenrys. In the case of a three-terminal flasher, the output conductor extends to one of the two output terminals, and this terminal is connectable with the other by means including normally open contacts of a load-sensitive relay the activating coil of which is constituted by the coiled length of the output conductor having an inductance value of about 5.8 to 6 microhenrys, thus inhibiting sparking and contact deterioration at both the relay contacts and the flasher contacts.

11 Claims, 6 Drawing Figures

FLASHER INDUCTANCE CIRCUIT

The present invention relates to flasher devices for intermittently energizing vehicle signal lamps from a D.C. voltage source and, more particularly, to a circuit for such flashers by which deterioration of their repetitively closed and opened electrical contacts is inhibited.

Motor vehicles generally have signal lamps in a battery-energized circuit that contains a flasher by which lamps may be energized intermittently, or flashed, either selectively as a turn signal to indicate the operator's intention to alter the direction of vehicle movement or, in many applications, lamps may be flashed en masse to indicate an emergency or hazardous condition. The flasher makes and breaks repetitively the energizing circuit to the signal lamps and also, typically, an energizing circuit to a pilot lamp that indicates operation of the signal lamps by flashing in conjunction therewith.

Various types of flashers for such uses are known, as illustrated, for instance, in U.S. Pat. Nos. 3,153,125; 3,302,057; Re. 26,835; 3,508,237 and 3,925,757. These known flashers all include a set of flasher contacts which must be repetitively actuated to make and break the circuit between the vehicle voltage source and the signal lamps to provide intermittent flashing of the lamps.

The flashers most commonly used in motor vehicles are of the variable load type, i.e., the flash frequency is substantially independent of the number of signal lamps or any outage thereof. Such a flasher generally comprises a set of normally open flasher contacts, together with means typically including a resistance wire in a current path bridging these contacts for closing them in response to a heating of the resistance wire by a current flow through the resistance wire from the battery, and means for opening these contacts in response to discontinuance of such current flow, with consequent cooling of the resistance wire, which occurs when the flasher contacts, by closing, have shunted the current from the path containing the resistance wire. This cyclic operation is repeated at frequent intervals to provide the intermittent flashing of the signal lamps.

Variable load flashers are commercially available in either two-terminal or three-terminal versions. The flasher contacts of the former are susceptible to deterioration by a sparking which occurs across the diminishing contact gap during closure of these contacts. This contact deterioration often results in premature malfunctioning of the flasher. The three-terminal version includes a second set of normally open contacts in a relay responsive to the current drawn by the signal lamps for pilot lamp operation in a manner to provide an indication of signal lamp outage. Like the flasher contacts of the two-terminal flasher, these relay contacts are also susceptible to deterioration by a sparking across their gap during closure, often resulting in a premature malfunction.

The object of the present invention is to provide a flasher structure by which the above mentioned deterioration of contacts is inhibited. A further object is to provide such a flasher suitable for use with many of the several signal lamp circuit designs commonly found in motor vehicles at little added expense and with little or no loss of or change in flasher performance, and which does not require alteration of the number, design or relative location of the terminals provided for installing the flasher in an electrical receptacle, or socket, of standardized form.

It has been found that the deterioration of repetitively closed and opened contacts in a flasher, which results from a sparking across the gap between the contacts as they are being closed, can be inhibited by providing a coiled length of a conductor, having a suitable inductance value, in a current line including the set of contacts and the output terminal, or one of two output terminals, of the flasher. It appears that, in this way, a build-up of current intensity and electron emissions across the contact gap is retarded and limited so that relatively little contact deterioration occurs by sparking as the contacts are closed.

A flasher according to the present invention, therefore, can be provided with elements like those of common variable load flashers by the further provision of means including a coiled length of the conductor connecting a junction beyond the flasher contacts with at least one output terminal, for conducting current between the flasher contacts and each output terminal to produce in each current line containing a set of contacts an inductance effective to inhibit deterioration of the contacts by sparking as they are closed.

In the case of a two-terminal flasher, wherein a single output terminal is provided for connection to a circuit containing signal lamps and a pilot lamp in parallel, the conductor having the coiled inductance length simply connects the signal output terminal with the junction beyond the flasher contacts. In a two-terminal flasher for use in a signal lamp circuit having a relatively high current load, i.e., a circuit containing 8 or more signal lamps, the coiled conductor length is wound about a heat conductive core member connected to the single output terminal to thus enable the core member to conduct away from the flasher heat generated by current flow through the coiled conductor. In a two-terminal flasher for use in a signal lamp circuit having a lower current load the coiled length may simply have an air core. It has been found that a coiled conductor length having an inductance value of about 5.8 to 6 microhenrys for the former case and 2 to 2.2 microhenrys for the latter case is effective to inhibit deterioration of the flasher contacts by sparking as they are closed so as to extend the service life of the flasher quite considerably.

In the case of a three-terminal flasher, the conductor having the coiled inductance length extends from a junction beyond the flasher contacts to one of the output terminals, and that output terminal is connectable with the other through means including normally open contacts of a load-sensitive relay the activating coil of which is constituted by the coiled length of the conductor. For such a flasher, a coiled conductor length having sufficient turns to provide an inductance value of about 5.8 to 6 microhenrys has been found effective to extend considerably the service life of both the relay contacts and the flasher contacts.

The foregoing and other objects, features and advantages of the invention will be apparent from the following detailed description and the accompanying drawings of illustrative embodiments of the invention. In the drawings.

Figure 1:
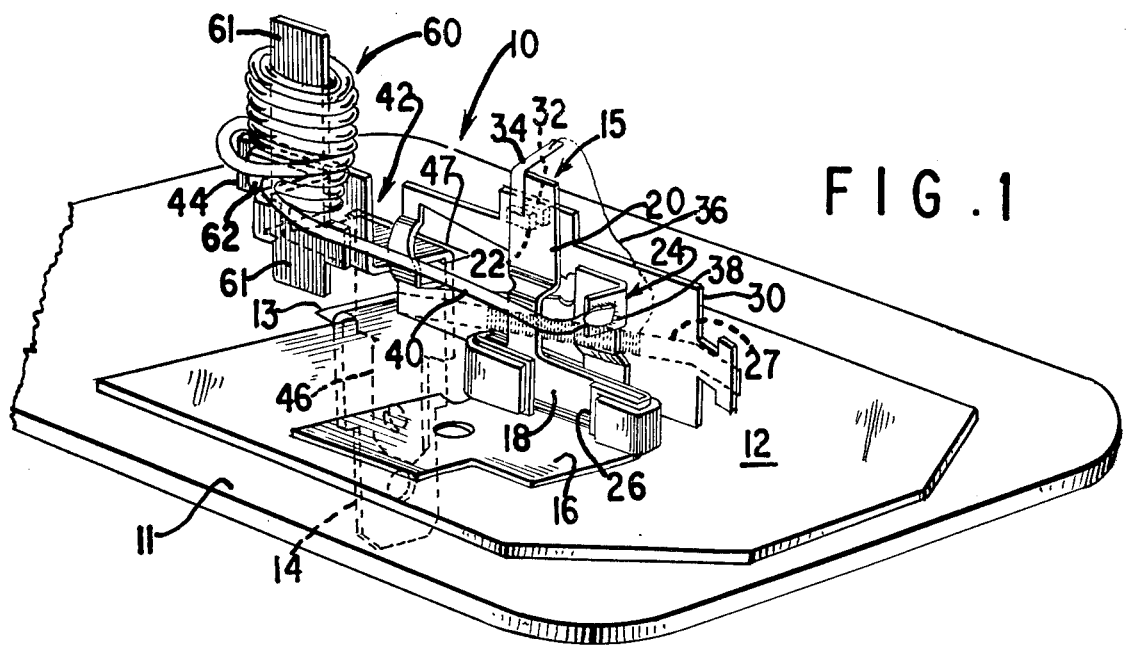
FIG. 1 is an enlarged perspective view of a two-terminal flasher utilizing the invention.
Figure 2:
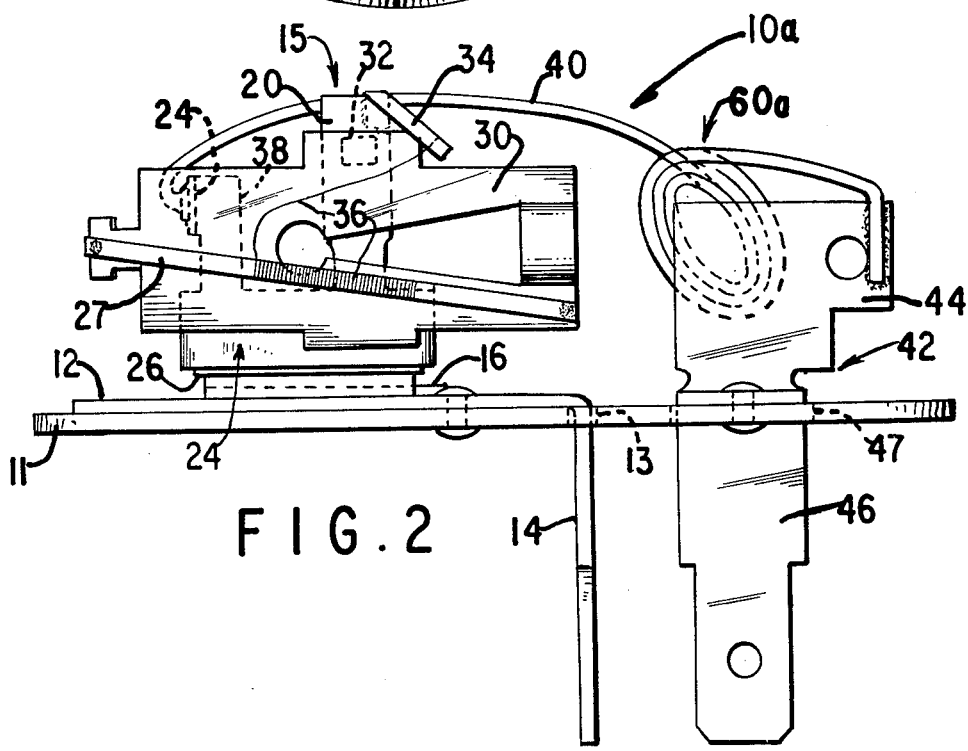
FIG. 2 is an enlarged side elevational view, partly in section, of another two-terminal flasher utilizing the invention.

FIGS. 1 and 2 of the drawings illustrate, respectively, a variable load two-terminal flasher 10 for a motor vehicle signal lamp circuit having a relatively high current load and a variable load two-terminal flasher 10a for a motor vehicle signal lamp circuit having a lower current load, each according to the invention and absent its normally provided protective cover. The flashers include components similar to those of commercially available variable load two-terminal flashers, e.g., that sold as the Model 552 flasher of Ideal Corporation, Brooklyn, N.Y. in that they each include a rigid electrically insulating base 11 made of a phenolic resin or other suitable material having affixed to it an electrically conductive plate 12 a leg 14 of which extends through a slot 13 in the base and protrudes therebelow. Secured upon the plate 12 is a leg 16 of a conductive, generally L-shaped support 15, the upstanding leg 18 of which has an elongate upward extension 20 to which is attached a fixed flasher contact 22. Crimped upon the upstanding leg 18 is a conductive support 24 having generally an elongate C-shaped cross-section. The C-shaped support 24 is electrically isolated from the L-shaped support 15 by a strip 26 of insulating material therebetween and has affixed on its far side as shown in FIG. 1, a resilient vane 30 composed of spring steel or other resilient electrically conductive material. The vane has a preset biased configuration and is maintained in a deformed condition against the resilience of this preset bias by a thermally expansible ribbon 27 attached at each end thereof to the vane. The vane 30 has secured on its upper end portion a flasher contact 32 narrowly spaced form the fixed flasher contact 22, which contact 32, when the vane 30 assumes its preset configuration, engages contact 22. Connected to the extension 20 of the L-shaped support by a conductive connector 34 is one end of a resistance heating wire 36 having an electrically insulating coating thereon, which wire is spirally wound along a length of the expansible ribbon 27 and connected at its other end to the ribbon to thus provide a current path between the connector 34 and vane 30.

Extending upwards from the C-shaped support 24 is an extension 38 thereof to which is attached by soldering or other appropriate means, one end of an electric conductor 40, the other end of this conductor being attached, for example by soldering, to an upstanding leg 44 of terminal member 42. Terminal member 42 is affixed to the base 11 and has a leg 46 which extends through a slot 47 in the base and protrudes therebelow. The legs 14 and 46 extending through the base 11 constitute the X terminal and the L terminal, respectively, of the flasher and are located relative to each other for insertion into a female socket connected in a motor vehicle signal lamp circuit.

Figure 3:
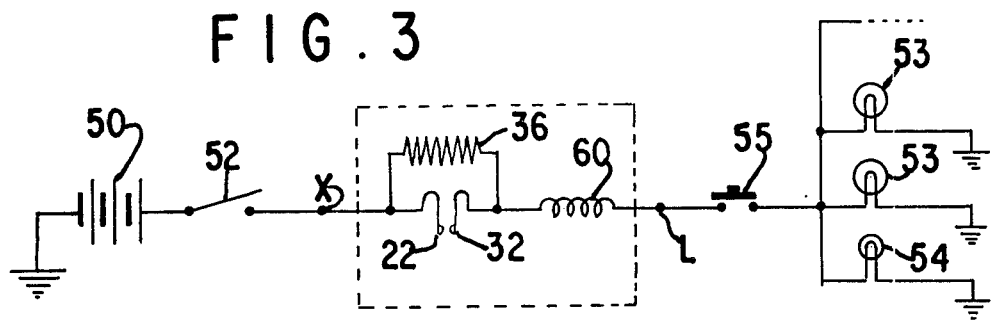
FIG. 3 is a schematic diagram of a vehicle signal lamp circuit incorporating the flasher of either FIG. 1 or FIG. 2.

The schematic diagram of FIG. 3 illustrates the electrical connections and the operation of the flasher 10 or 10a of FIGS. 1-2 in the signal lamp circuit of a motor vehicle. The X terminal is connected to the battery 50 of the vehicle, commonly of 12 volts, through the ignition switch 52. The L terminal is connected through a signal lamp activating switch 55, which may be, for example, a turn signal switch or emergency flasher switch of a motor vehicle, to the load of a circuit containing the signal lamps 53 and a pilot lamp 54 in parallel. It will be understood by those skilled in the art, that in the signal lamp circuit of a motor vehicle, the flow of electrons during activation of the signal lamps will be from ground through the lamps, into the L terminal of the flasher and from the X terminal of the flasher to the battery and thus back to ground. In the following description, however, the direction of current flow will be described by the conventional current theory, i.e., from the battery through the flasher and thence to the grounded lamps.

During the initial passage of current between the battery 50 and the lamps 53 and 54 through the resistance heating wire 36 upon closure of the ignition switch 52 and lamp activating switch 55, the lamps remain unlit due to the high resistance of the wire and the expansible ribbon 27 is heated and expanded thereby allowing the vane 30 to assume its biased contact closing configuration by a snap action thereof. The current which is sufficient to cause illumination of the lamps will then flow through the closed flasher contacts 22 and 32, bypassing the wire, and permitting a cooling and contracting of the ribbon 27, thereby reopening the flasher contacts, hence again passing the current through the resistance heating wire. The cycle is repeated as long as the switches 55 and 52 are closed, thereby providing an intermittent flashing of the signal lamps 53 and the pilot lamp 54.

The signal and pilot lamps constituting the major current load of the motor vehicle signal lamp circuit are typically tungsten-filament lamps which exhibit a positive resistance characteristic, e.g., the resistance of each signal lamp typically used in a motor veicle signal lamp circuit at its operating temperature is approximately fifteen times greater than the resistance of the lamp unlit. Further, as the flasher contacts approach closure, a field potential of the order of $10^6$ to $10^7$ volts per centimeter is developed across the diminishing contact gap. Accordingly, a spark tends to occur across the diminishing contact gap and the flow of electrons constituting this spark is quite large due to the initial low resistance of the lamps. The electron departure from the cathode contact and the electron bombardment of the anode contact of the flasher erodes the anode contact and the eroded material from this contact is deposited on the cathode contact thereby forming a respective crater and pip on the surface of the contacts. The continued deterioration of the flasher contacts by the formation of this crater and pip results in the contacts interlocking, rendering the flasher inoperative.

According to the invention, the above described deterioration of the flasher contacts of a two-terminal variable load flasher is inhibited by providing a coiled length 60 of the conductor 40 in the current line between the junction at extension 38 and the output terminal L of the flasher. The resulting inductance produced by this coiled length will oppose abrupt increases in current thus reducing the emission of electrons from the cathode contact across the diminishing contact gap during closure of the contacts.

FIG. 1 illustrates a two-terminal variable load flasher of the present invention developed for use in a vehicle signal lamp circuit having a relatively high current load, e.g., the signal lamp circuits of certain trucks and passenger buses which include eight or more signal lamps. The conductor 40 includes a coiled length 60 thereof wound about a heat conductive core member 61 connected, for example by soldering, through its stepped extension 62 to the leg 44 of terminal member 42. In this way, the heat generated by the current flow through the coiled length 60 during activation of the signal lamps is conducted by the core member 61 to the output terminal L and away from the flasher, thereby avoiding heat build up within the flasher which would interfere with the heating and cooling rate of the ribbon 27.

It has been found that the life of the flasher contacts of the high load, two terminal variable load flasher of the present invention is significantly extended when the coiled length 60 of the conductor possesses as inductance value of about 5.8 to 6 microhenrys. For example, a conductor of 18 AWG cooper wire insulated by an enamel coating, e.g., of "Poly-Thermalese," and having a coiled length thereof formed by approximately 16 turns wound in two layers of left hand wind about the core member has been found effective, where the inside turn layer consists of 9 elliptic turns of 0.190 inch I.D. on their major axis and 0.130 inch I.D. on their minor axes, and the outside turn layer consists of 6 or 7 turns wound upon the inside turn layer.

FIG. 2 illustrates a two-terminal variable load flasher of the present invention suitable for use in a vehicle signal lamp circuit having a low current load, e.g., the signal lamp circuits of many family passenger cars which include less than eight signal lamps. It has been found that the life of the flasher contacts of wuch flashers is significantly extended by making the coiled length of the conductor so as to produce and inductance value of about 2 to 2.2 microhenrys. For example, an insulated conductor of enamel coated 18 AWG copper wire having a coiled length of approximately 25 turns wound with an air core to provide three concentric layers of turns has been found satisfactory.

Figure 4:
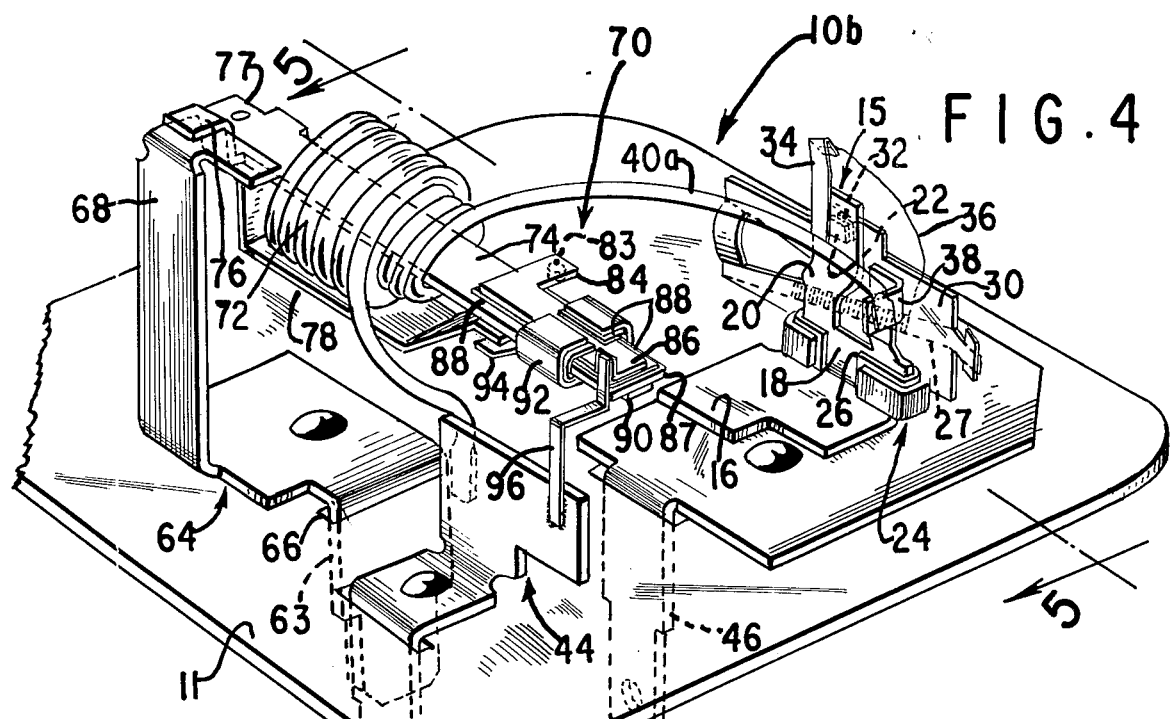
FIG. 4 is an enlarged perspective view of a three-terminal flasher utilizing the invention.
Figure 5:
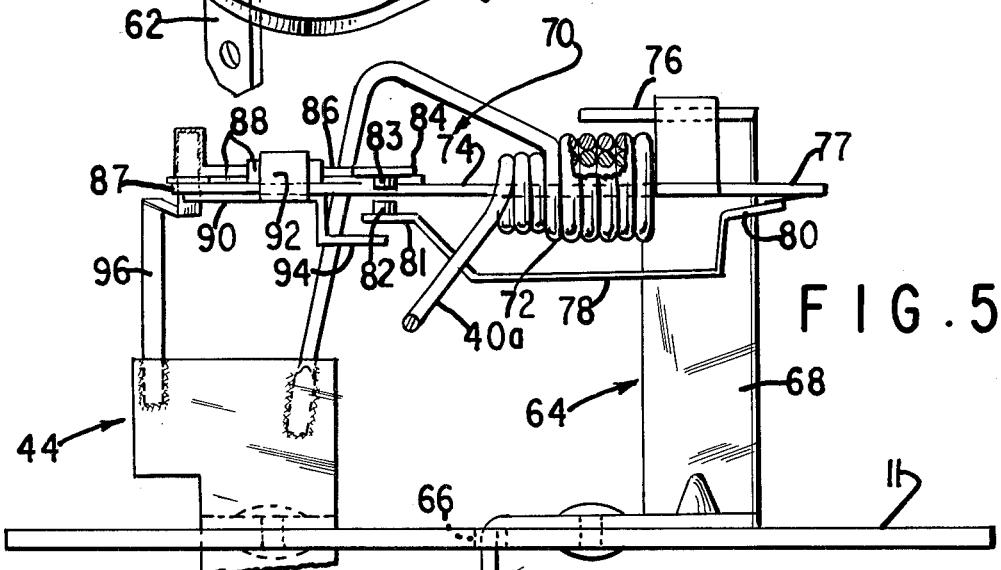
FIG. 5 is a cross-sectional view taken along line 5—5 of FIG. 4.

FIGS. 4 and 5 illustrate the construction of the interior components of a variable load three-terminal flasher 10b according to the invention for the signal lamp circuit of a motor vehicle. The three-terminal flasher includes many of the structures of a two-terminal flasher and such similar structures are designated by reference numerals corresponding to those of FIGS. 1 and 2. The three-terminal flasher, however, includes an additional output terminal, terminal P, formed by the leg 63 of the terminal member 64, which leg extends through a slot 66 in base 11.

The terminal member 64 has an upstanding leg 68 to which leg is secured a relay 70. The relay 70 includes a coil 72 wound about a core member 74 secured to leg 68 by a stepped extension 76 of one end 77 of the core member, and an armature 78 having one end 80 secured to end 77 of the core member and a free end 81 carrying a relay contact 82 normally spaced from and vertically aligned with a fixed relay contact 83. Fixed contact 83 is mounted to the lower side of a lateral projection 84 of a conductive plate 86 mounted upon the end portion 87 of core member 74 but electrically isolated from the core member by a strip 88 of insulating material therebetween. A lower plate 90 beneath the core and portion 87 has upstanding fingers 92 which are crimped down upon the plate 86 to secure plates 86 and 90 to core member end portion 87. Projecting downwardly from lower plate 90 to a location beneath the free end 81 of the armature is a stop 94 limiting the downward movement of relay contact 82. The coil 72 of the relay is constituted by a coiled length of the conductor 40a connected at one end thereof at the junction formed by the extension 38 of the C-shaped support 24 and by the other end thereof to the upstanding leg 44 integral with terminal L.

Figure 6:
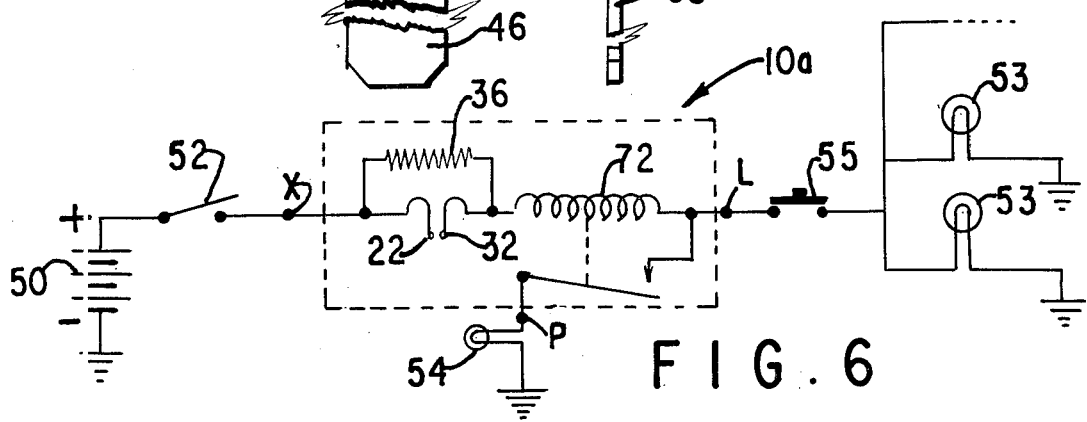
FIG. 6 is a schematic diagram of a vehicle signal lamp circuit incorporating the flasher of FIGS. 4 and 5.

The schematic diagram of FIG. 6 illustrates the electrical connections of the terminals X, L and P of the flasher 10b in a motor vehicle signal lamp circuit, where structures similar to those of FIG. 3 are designated by corresonding reference numerals. The X terminal is connected to the vehicle battery 50 through ignition switch 52, the output terminal L is connected to the load of a circuit containing the signal lamps 53 in parallel through signal lamp activating switch 55, and the output terminal P is connected to a circuit containing the pilot lamp 54. The coil 72 of the relay is in the load line leading to the circuit containing the signal lamps and the strength of the magnetic field generated by this coil during current flow therethrough is dependent upon the sum of the currents drawn by the signal lamps. Upon each closure of the flasher switch contacts 22 and 32, the magnetic field generated by the current passing through the coil is sufficient to attract the armature 78 and close the relay contacts 82 and 83 only when each signal lamp is lit. Consequently, an undesirable signal lamp outage will reduce the current drawn through the coil and the reduced strength of the magnetic field will not be sufficient to attract the armature 78 and close the relay contacts 82 and 83. Accordingly, the pilot light can be made to give an indication of signal lamp outage.

It has been found that the load sensitive activating coil of the relay of the three-terminal flashers of the type described above, e.g., the commercially available Model 550 and Model 568 flashers of Ideal Corporation, Brooklyn, New York, will generally have a suitable inductance value to inhibit deterioration of the flasher contacts by sparking across their gap during closure. However, in such prior art flashers, the relay contacts are in a current line within the flasher separate from the flasher current line containing the load sensitive activating coil of the relay and, accordingly, the flasher circuit fails to inhibit deterioration of the relay contacts by sparking as they are closed by the inductance produced by the load sensitive activating coil. Deterioration of the relay contacts by the formation of a crater and pip, respectively, in the relay contacts as described above for the flasher contacts, can result in the relay contacts interlocking, rendering the flasher inoperative for its intended functions.

According to the invention, the deterioration of the flasher contacts and the relay contacts of a three-terminal variable load flasher is inhibited by interconnecting the output terminal L to which the load sensitive activating coil of the relay is connected, and the output terminal P by a current line including the relay contacts. The inductance produced by the relay activating coil thus inhibits contact deterioration by sparking across their gap during closure of both the relay contacts and the flasher contacts. A three-terminal variable load flasher is thereby provided which inhibits contact deterioration without any significant alteration of the manner or the characteristics of its performance so as to be suitable for use in motor vehicle signal lamp circuits of a common or standard design.

In the embodiment illustrated in FIGS. 4–5, the plate 86 having the fixed relay contact 83 secured thereto has one end of a conductive lead 96 connected therewith, which lead extends to the leg 44 integral with the output terminal L. The current line between the terminal X of the flasher and the output terminal P thus includes the activating coil 72 of the relay and the relay contacts 82 and 83 whereby an inductance value sufficient to inhibit deterioration of the relay contacts is provided in such current line.

It has been found that the life of both the flasher contacts and the relay contacts of the three-terminal variable load flasher can be significantly extended, and the relay kept properly responsive to the current drawn by the signal lamps, by providing the relay with an activating coil which possesses an inductance value of about 5.8 to 6 microhenrys. For example, the conductor 40a may be similar in material to conductor 40, i.e., 18 AWG copper wire insulated by an enamel coating, and the coil may comprise a coiled length of the conductor identical to the coiled length 60 in the flasher of FIG. 1.

The use of a coiled length of a conductor in series with a pair of contacts susceptible to sparking across their diminishing gap during closure to produce an inductance effective to inhibit deterioration of these contacts has been described in the above illustrative embodiments of the invention for inhibiting the deterioration of the contacts in two-terminal and in three-terminal variable load flashers. As will be apparent to those skilled in the art, the teachings of this invention may be equally applied to the fixed load flashers utilized in some applications of vehicle signal lamp circuits.

What is claimed is:

1. In a flasher for intermittently connecting vehicle signal lamps and at least one pilot lamp with a D.C. voltage source, comprising at least one set of normally open contacts including a set of normally open flasher contacts, a first terminal connected with one of said flasher contacts for connecting it with said source, a junction connected with the other of said flasher contacts, at least one output terminal for connection with said signal and pilot lamps, each said set of contacts having means connected therewith for closing the contacts thereof in response to a flow of current between said first terminal and said at least one output terminal, and means responsive to closing of said flasher contacts for opening them to discontinue current flow to said at least one output terminal, the improvement which comprises means, including a conductor extending between said junction and one said output terminal, for conducting current between said other flasher contact and each said output terminal, said conductor having a length thereof in series with each said set of contacts, said length being coiled so as to produce an inductance effective to inhibit deterioration of the contacts of each said set by sparking as said contacts of each said set are closed.

2. A flasher according to claim 1, wherein there is only one said output terminal, for connection to a circuit containing said signal lamps and said pilot lamp in parallel, said conductor which contains said coiled length extending from said junction to the single output terminal.

3. A flasher according to claim 1 wherein there is only one said output terminal, for connection to a circuit containing said signal lamps and said pilot lamp in parallel, said conductor which contains said coiled length extending from said junction to the single output terminal, and said coiled length having a heat conductive core member disposed inside its coils and connected to said one output terminal.

4. A flasher according to claim 1 wherein there is only one said output terminal, for connection to a circuit containing said signal lamps and said pilot lamp in parallel, said conductor which contains said coiled length extending from said junction to the single output terminal, and said coiled length having a heat conductive core member disposed inside its coils and connected to said one output terminal, said coiled length having an inductance value of about 5.8 to 6 microhenrys.

5. A flaser according to claim 1 wherein there is only one said output terminal, for connection to a circuit containing said signal lamps and said pilot lamp in parallel, said conductor which contains said coiled length extending from said junction to the single output terminal, said coiled length having air as its core and having an inductance value of about 2 to 2.2 microhenrys.

6. A flasher according to claim 1 wherein there are two said output terminals, one for connection with said signal lamps and a second for connection with said pilot lamp, said conductor extending from said junction to said one output terminal, and means including one of said sets of normally open contacts for interconnecting said output terminals, said one set of contacts being the contacts of a load-sensitive relay the activating coil of which is constituted by said coiled length of said conductor.

7. A flasher according to claim 1 wherein there are two said output terminals, one for connection with said signal lamps and a second for connection with said pilot lamp, said conductor extending from said junction to said one output terminal, and means including one of said sets of normally open contacts for interconnecting said output terminals, said one set of contacts being the contacts of a load-sensitive relay the activation coil of which is constituted by said coiled length of said conductor, said coiled length having an inductance value of about 5.8 to 6 microhenrys.

8. In a two-terminal flasher for intermittently connecting a D.C. voltage source with a circuit containing vehicle signal lamps and a pilot lamp in parallel, comprising a set of normally open flasher contacts, a first terminal connected with one of said flasher contacts for connecting it with said source, a single output terminal, said output terminal being connected through a conductor with the other of said flasher contacts for connecting it with said circuit, means connected with said contacts for closing them in response to a flow of current between the two terminals, and means response to closing of said contacts for opening them to discontinue current flow therethrough, the improvement which comprises said conductor having a length thereof coiled so as to produce an inductance effective to inhibit deterioration of the flasher contacts by sparking as said contacts are closed.

9. A two terminal flasher according to claim 8, said coiled length having a heat conductive core member dispoed inside its coils and connected to said single output terminal.

10. A two-terminal flasher according to claim 8, said coiled length having a heat conductive core member disposed inside its coils and connected to said single output terminal, said coiled length having an inductance value of about 5.8 to 6 microhenrys.

11. A two-terminal flasher according to claim 8, said coiled length having air as its core and having an inductance value of about 2 to 2.2 microhenrys.

* * * * *